United States Patent
Kaneko et al.

(10) Patent No.: US 11,675,553 B2
(45) Date of Patent: Jun. 13, 2023

(54) PRINTER, PRINT SYSTEM, AND STORAGE MEDIUM STORING PROGRAM CONFIGURED TO PERFORM DOWNLOAD PRINTING BY DIFFERENT MODES

(71) Applicant: BROTHER KOGYO KABUSHIKI KAISHA, Nagoya (JP)

(72) Inventors: Tomoya Kaneko, Nagoya (JP); Katsunori Enomoto, Toyokawa (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 17/663,451

(22) Filed: May 16, 2022

(65) Prior Publication Data
US 2022/0405030 A1    Dec. 22, 2022

(30) Foreign Application Priority Data
Jun. 22, 2021    (JP) .............................. JP2021-102906

(51) Int. Cl.
*G06F 3/12*    (2006.01)

(52) U.S. Cl.
CPC .......... *G06F 3/1227* (2013.01); *G06F 3/1208* (2013.01); *G06F 3/1236* (2013.01); *G06F 3/1285* (2013.01)

(58) Field of Classification Search
CPC .... G06F 3/1227; G06F 3/1208; G06F 3/1236; G06F 3/1285
USPC ...................................................... 358/1.13
See application file for complete search history.

(56) References Cited

U.S. PATENT DOCUMENTS

| | | | |
|---|---|---|---|
| 8,769,107 B2* | 7/2014 | Kudo | G06K 15/1802 709/227 |
| 9,430,723 B1* | 8/2016 | Panda | G06F 3/12 |
| 2014/0313548 A1* | 10/2014 | Nishikawa | G06F 3/1238 358/1.15 |
| 2018/0054540 A1 | 2/2018 | Okuno | |
| 2019/0286386 A1* | 9/2019 | Barnel | H04N 1/6097 |

(Continued)

FOREIGN PATENT DOCUMENTS

JP    2018-32891 A    3/2018

*Primary Examiner* — Allen H Nguyen
(74) *Attorney, Agent, or Firm* — Scully, Scott, Murphy & Presser, PC

(57) ABSTRACT

A controller is configured to: acquire access information indicating a transmission source of instruction data, a process to be executed by a printer including download printing of downloading a document from a storage on a network and printing the document, a print mode in the download printing including first and second modes, based on the access information, access, via a communication interface, a server that is the transmission source of the instruction data, and receive the instruction data transmitted from the server; and in response to determining that the instruction data includes an execution instruction of the download printing, determine the print mode based on characteristics of the document; and based on the determined print mode, download the document via the communication interface, from a particular storage instructed by the instruction data, thereby receiving the document, and perform printing based on the received document, thereby performing the download printing.

15 Claims, 9 Drawing Sheets

(56) References Cited

U.S. PATENT DOCUMENTS

2020/0177749 A1\* 6/2020 Ando .................... G06F 3/1204
2020/0285424 A1\* 9/2020 Matsuzaka ............ G06F 3/1226

\* cited by examiner

FIG. 2

| REGISTRATION OF INSTRUCTION DATA | |
|---|---|
| APPLICATION ID | APPLICATION 1 |
| NAME | DOWNLOAD PRINTING 1 |
| URL | http://www.server_c.com/print_top.xml |
| DEFAULT PRINT MODE | PARALLEL MODE |

REGISTRATION    CANCEL

FIG. 4A

```
<Display>
        <NextURL>http://www.server-c.com/sel_kind_result</NextURL>
        <Title>Select print type</Title>
        <Select key=kind>
                <Item val="1">Manual</Item>
                <Item val="2">Application form</Item>
        </Select>
</Display>
```

FIG. 4B

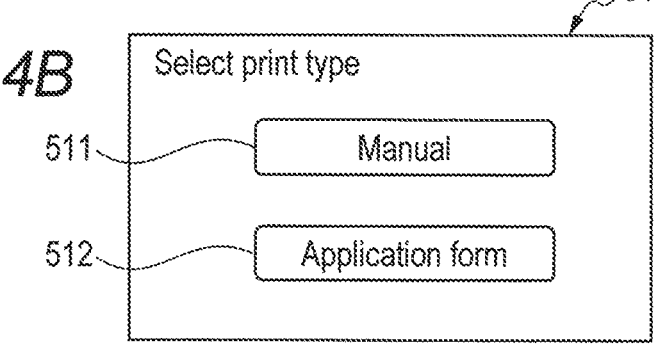

FIG. 5A

```
<Command>
        <DownloadPrint>
                <Path>http://www.server-d.com/manual/users.prn</Path>
                <Collate>1</Collate>
                <ParallelProcessing>true</ParallelProcessing>
        </DownloadPrint>
</Command>
```

FIG. 5B

```
<Command>
        <DownloadPrint>
                <Path>http://www.server-d.com/form/users.prn</Path>
                <Collate>1</Collate>
                <ParallelProcessing>false</ParallelProcessing>
                <datasize>200KB</datasize>
        </DownloadPrint>
</Command>
```

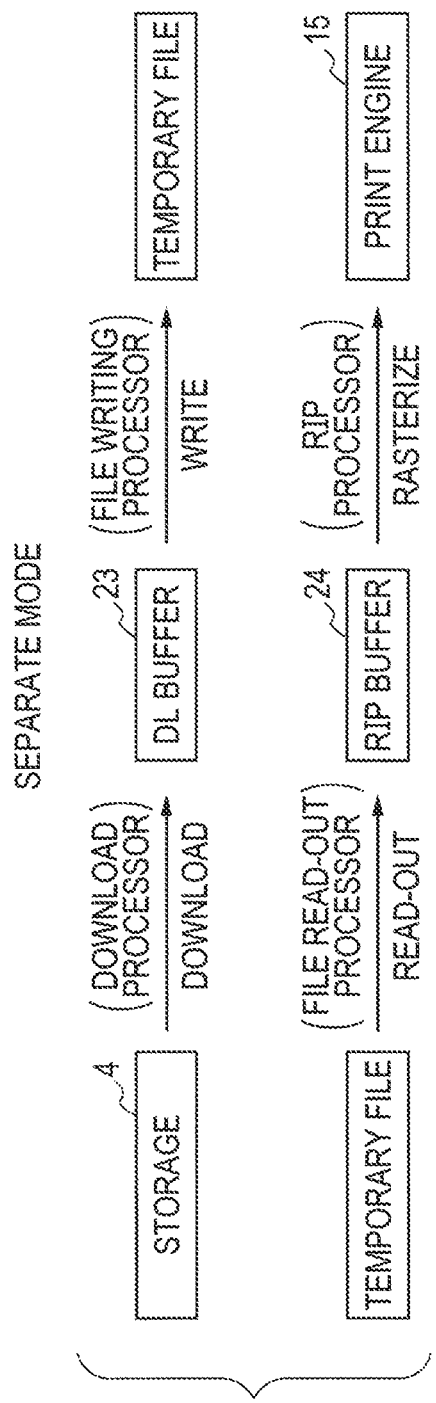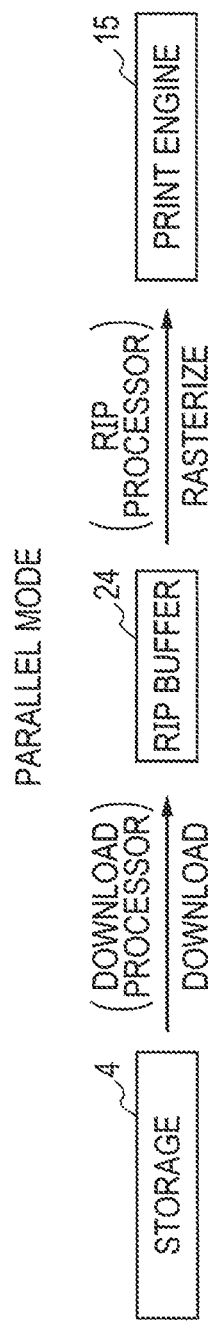

PRINTER, PRINT SYSTEM, AND STORAGE MEDIUM STORING PROGRAM CONFIGURED TO PERFORM DOWNLOAD PRINTING BY DIFFERENT MODES

REFERENCE TO RELATED APPLICATIONS

This application claims priority from Japanese Patent Application No. 2021-102906 filed on Jun. 22, 2021. The entire content of the priority application is incorporated herein by reference.

BACKGROUND ART

Conventionally, a print system including a printer and a server is known.

DESCRIPTION

In a print system, a printer accesses a server, analyzes instruction data sent from the server, and performs processing according to the instruction data. The printer performs download printing of downloading a document from a storage and printing the document. For example, in a case where the instruction data includes an execution instruction for download printing, the printer performs download printing according to the instruction data.

When receiving a document and performing printing of the document, a mode of starting printing after completing download of an entire document and a mode of starting printing before completing download of an entire document, that is, performing reception and printing of the document in parallel are considered as the print mode. These print modes have advantages and disadvantages, and which print mode is suitable may change depending on the type and content of a document.

This specification discloses a technique for increasing a possibility that printing is performed by a print mode suitable for a document of the print target in a printer that performs printing of a received document.

According to one aspect, this specification discloses a printer. The printer includes a communication interface and a controller. The controller is configured to: acquire access information indicating a transmission source of instruction data, the instruction data instructing a process to be executed by the printer, the process to be executed by the printer including download printing of downloading a document from a storage on a network and printing the document, a print mode in the download printing including a first mode and a second mode different from the first mode, based on the access information, access, via the communication interface, a server that is the transmission source of the instruction data, and receive the instruction data transmitted from the server; and in response to determining that the instruction data includes an execution instruction of the download printing, determine the print mode in the download printing based on characteristics of the document specified by the execution instruction of the download printing; and based on the determined print mode, download, via the communication interface, the document specified by the execution instruction of the download printing, from a particular storage instructed by the instruction data, thereby receiving the document, and perform printing based on the received document, thereby performing the download printing. The download printing includes in response to determining the print mode in the download printing to be the first mode, performing the download printing by the first mode, the first mode being a mode of, after completing reception of an entirety of the document specified by the execution instruction of the download printing, starting printing based on the entirety of the document; and in response to determining the print mode in the download printing to be the second mode, performing the download printing by the second mode, the second mode being a mode of, before completing reception of the entirety of the document specified by the execution instruction of the download printing, starting printing based on a received portion of the document. The second mode is a mode in which reception of the document and printing based on the document are performed in parallel. The controller may be configured to: receive, via the communication interface, instruction data transmitted from an external device, the instruction data being data instructing printing of a document received via the communication interface; determine a print mode in the printing, based on characteristics of the document received via the communication interface; and based on the determined print mode, receive the document via the communication interface and perform printing based on the received document, thereby performing reception printing. The reception printing includes: in response to determining the print mode to be a first mode, performing the reception printing by the first mode, the first mode being a mode of, after completing reception of an entirety of the document received via the communication interface, starting printing based on the entirety of the document; and in response to determining the print mode to be a second mode, performing the reception printing by the second mode, the second mode being a mode of, before completing reception of the entirety of the document received via the communication interface, starting printing based on a received portion of the document. The second mode is a mode in which reception of the document and printing based on the document are performed in parallel.

According to the technique disclosed herein, the printer automatically determines the print mode in download printing or reception printing based on the characteristics of the document specified in the execution instruction of download printing or reception printing, that is, the document of the print target. Thus, it is expected that download printing or reception printing is performed by the print mode suitable for the document.

A print system including the printer, a control method for realizing the function of the printer, a computer program, and a computer-readable storage medium for storing the computer program are also new and useful and are disclosed herein.

According to the technique disclosed herein, in a printer that performs download printing or reception printing based on instruction data, a technique is realized for increasing a possibility that printing is performed by a print mode suitable for a document of the print target.

Embodiments in accordance with this disclosure will be described in detail with reference to the following figures wherein:

FIG. 2 is an explanatory diagram showing an example of a registration screen of access information;

FIG. 4A is an explanatory diagram showing an example of instruction data;

FIG. 4B is an explanatory diagram showing an example of a display screen;

FIG. 5A is an explanatory diagram showing an example of instruction data;

FIG. 5B is an explanatory diagram showing an example of instruction data;

FIG. 10A is an explanatory diagram showing a data flow in a separate mode; and

FIG. 10B is an explanatory diagram showing a data flow in a parallel mode.

Figure 1:
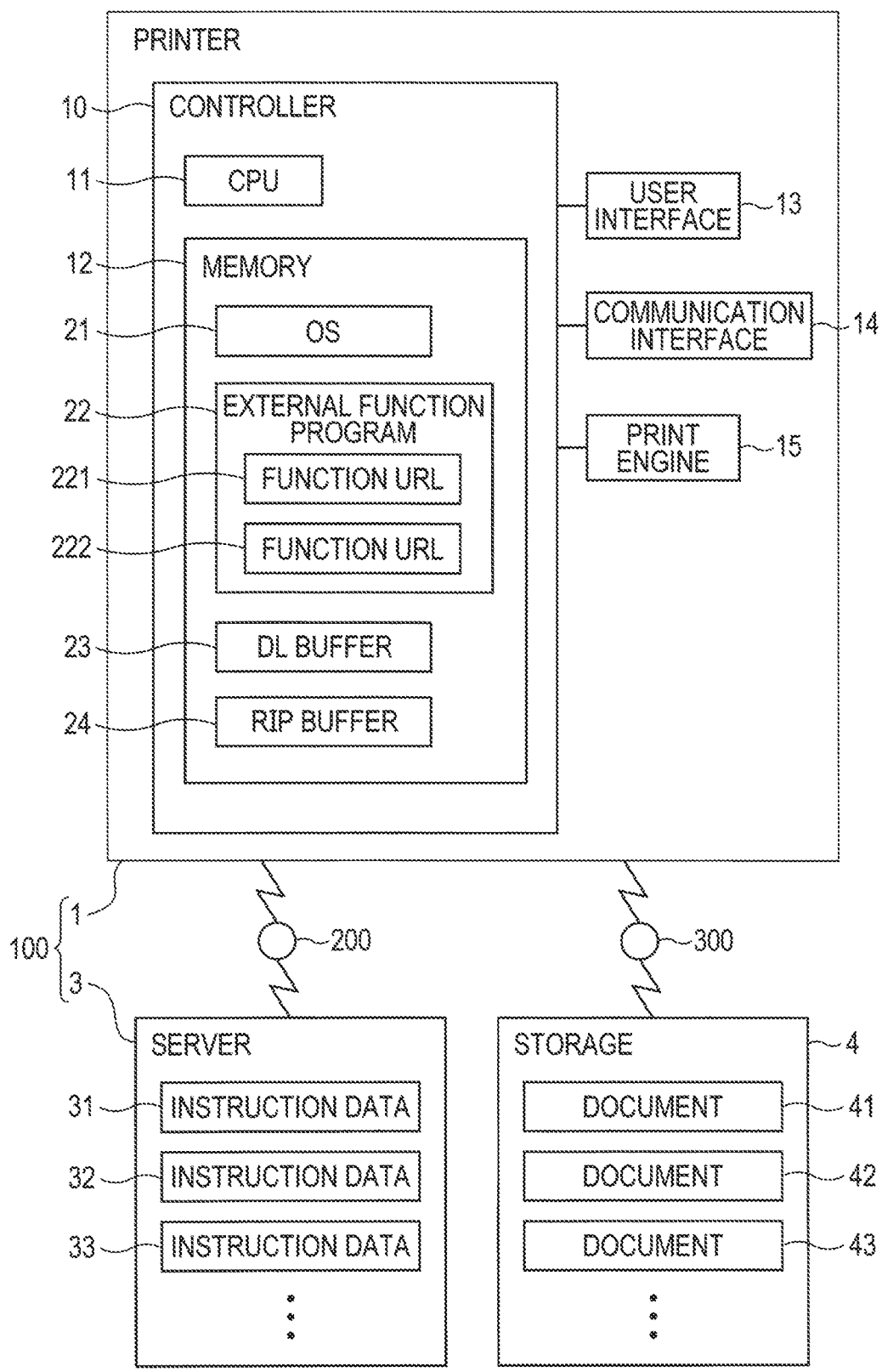
FIG. 1 is a block diagram showing the electrical configuration of a print system.

Hereinafter, a print system of an embodiment will be described in detail with reference to the attached drawings. A print system 100 of an embodiment includes, for example, a printer 1 and a server 3 as shown in FIG. 1, and these are connectable to each other via a network 200. The printer 1 is further connectable to a storage 4 via a network 300.

As shown in FIG. 1, the printer 1 of this embodiment includes a controller 10 including a CPU 11 and a memory 12. Further, the printer 1 includes a user interface (hereinafter also referred to as "user IF") 13, a communication interface (hereinafter also referred to as "communication IF") 14, and a print engine 15, and these are electrically connected to the controller 10. The CPU 11 may be an example of a controller.

The CPU 11 executes various processes according to a program read from the memory 12 and based on a user's operation. As shown in FIG. 1, the memory 12 stores various programs and various information including an operating system (hereinafter referred to as "OS") 21 and an external function program 22. The external function program 22 is an example of a program. The memory 12 is also used as a work area when various processes are executed. A buffer included in the CPU 11 is also an example of the memory.

An example of the memory 12 is not limited to a ROM, a RAM, an HDD, and so on, built in the printer 1, and may be a storage medium that is read and written by the CPU 11. A computer-readable storage medium is a non-transitory medium. In addition to the above examples, the non-transitory medium also includes recording media such as a CD-ROM and a DVD-ROM. The non-transitory medium is also a tangible medium. On the other hand, an electric signal that carries a program downloaded from a server and so on, on the Internet is a computer-readable signal medium which is a kind of a computer-readable medium, but is not included in a non-transitory computer-readable storage medium.

The external function program 22 is a program that acquires instruction data from an external device such as the server 3 and realizes the function by processes based on the acquired instruction data. In the external function program 22, function URLs 221 and 222 for each external function are registered in advance by the designer of the print system 100 and so on. The function URLs 221 and 222 may be stored in an internal memory (the memory 12) or may be stored in an external device which is accessible by the printer 1. That is, the memory storing the function URLs 221 and 222 may be an internal memory or an external memory. The function URLs 221 and 222 are information including access information indicating the transmission source of instruction data that starts execution of each external function. The details of the external function program 22 will be described later.

The memory 12 is further provided with a download buffer (hereinafter also referred to as "DL buffer") 23 and a RIP buffer 24. The DL buffer 23 is a buffer for temporarily storing data downloaded from an external device. The RIP buffer 24 is a buffer for temporarily storing data to be printed, which is the target of a rasterization process. Each of the DL buffer 23 and the RIP buffer 24 is a storage area having a particular size.

The user interface 13 is a touch panel, for example. The user interface 13 includes hardware for displaying a screen for notifying the user of information and hardware for accepting operations by the user. The user interface 13 may be a set of a display and a button, a key, and so on.

The communication interface 14 includes a configuration that is connectable to the network 200 and the network 300. The communication interface 14 includes hardware for communicating with the server 3 via the network 200 and hardware for communicating with the storage 4 via the network 300. The communication standard of the communication interface 14 may be Ethernet, Wi-Fi, USB, and so on ("Wi-Fi" is a registered trademark of the Wi-Fi Alliance). The printer 1 may include a plurality of communication interfaces 14 corresponding to a plurality of communication standards. The network 200 and the network 300 may be a local network connected to the printer 1 or may be the Internet. Further, the network 200 and the network 300 may be the same network.

The print engine 15 includes a configuration for printing an image based on image data on a print medium such as a sheet. The image forming method of the print engine 15 is, for example, an electrophotographic method or an inkjet method. The print engine 15 may be configured to perform color printing or configured to perform only monochrome printing.

As shown in FIG. 1, the server 3 stores one or more instruction data 31, 32, 33, and so on, and has a function of transmitting specified instruction data based on a transmission instruction from the printer 1 and so on. The server 3 is an example of a transmission source of instruction data. Each instruction data stored in the server 3 is information configured to be analyzed by the external function program 22 of the printer 1, and is, for example, an xml file prepared by the designer of the print system 100 and so on. The details of instruction data will be described later. The designer and so on of the print system 100 include, for example, a system administrator of a company that has introduced the printer 1, a vendor of the print system 100 including the printer 1, and a designer or a service person of a manufacturer or a dealer of the printer 1.

As shown in FIG. 1, the storage 4 stores various documents 41, 42, and 43 for download printing, for example. Each document is print target data prepared by the designer of the print system 100 and so on, and is data indicating, for example, various application forms, various report forms, operation manuals for various devices, and terms and conditions. The document is not limited to a text document, but may be a photograph, an image, or a chart. Each document stored in the storage 4 may be, for example, print data generated by a printer driver supporting the printer 1, or may be data in a standard format such as PDF format. The storage 4 may be a part of the server 3.

By storing a plurality of instruction data in the server 3 and allowing the printer 1 to access the server 3, the designer and so on of the print system 100 including the printer 1 and the server 3 may design the printer 1 to execute a series of processes combining displaying of an input screen, download printing, a process other than the download printing, and so on. The instruction data may include an instruction to acquire next instruction data. The designer and so on of the print system 100 stores, in the printer 1, information indicating instruction data that is first accessed by the printer 1 when the printer 1 executes a series of processes, as the function URLs 221 and 222.

In this specification, as a series of processes, download printing executed by the printer 1 based on the instruction data stored in the server 3 will be described. The download printing of this embodiment is a process in which the printer 1 downloads a document from the storage 4 on the network and executes printing based on the downloaded document. The function URL 221 of the printer 1 of this embodiment stores access information for starting execution of download printing. The access information is information indicating the storage location of one of the instruction data stored in the server 3. The access information is, for example, "http://www.server-c.com/print_top.xml".

The printer 1 may directly accept a registration instruction of a function URL via, for example, the user interface 13, or may accept the registration instruction via a personal computer and so on that is connectable to the printer 1. The personal computer and so on may register a function URL in the printer 1 by using, for example, an embedded web server (hereinafter referred to as "EWS") provided in the printer 1 or an application program dedicated to registration of function URLs. The EWS or the dedicated application program displays, for example, an input screen as shown in FIG. 2 on a personal computer and so on. FIG. 2 is an example of an input screen when a registration instruction to register a function URL is accepted. When the registration instruction is accepted in a state where the information of the function URL 221 is input in the URL input field, the printer 1 stores the function URL 221 in the memory 12 in association with its ID and name. Note that "http" shown in FIG. 2 and so on may be changed to "https".

Next, the procedure of an external function process executed by the external function program 22 of the printer 1 based on an instruction of the user who uses the print system 100 will be described with reference to the flowchart of FIG. 3. The external function process is executed by the CPU 11 of the printer 1 in response to accepting an instruction by the user to start execution of the external function program 22 via the user interface 13, for example.

The following process basically indicates the process of the CPU 11 according to the instruction described in a program. That is, the processes such as "determination", "extraction", "selection", "calculation", "decision", "identification", "acquisition", "reception", and "control" in the following description represent the processes by the CPU 11. The process by the CPU 11 also includes hardware control using an API of the OS. In this specification, the operation of each program will be described by omitting the description of the OS. That is, in the following description, the description that "a program B controls hardware C" may mean "a program B controls hardware C using the API of the OS". In addition, the process of the CPU 11 according to the instruction described in the program may be described in abbreviated wording. For example, it may be described as "the CPU 11 performs". Further, the process of the CPU 11 according to the instruction described in the program may be described by a wording that omits the CPU, such as "a program A performs".

Note that "acquisition" is used as a concept that does not require a request. That is, a process of receiving data without being requested by the CPU 11 is also included in the concept of "the CPU acquires data". The "data" in this specification is represented by a computer-readable bit string. Data having the same substantial meaning and different formats are treated as the same data. The same applies to "information" in this specification. Further, "request" and "instruct" are concepts indicating that information indicating that a request is being made or information indicating that an instruction is being given is outputted to the counterpart. Further, the information indicating that the request is being made or the information indicating that the instruction is being given is simply described as "request" or "instruction", respectively.

Further, the CPU 11's process of determining whether information A indicates matter B may be conceptually described as "determining from information A whether it is matter B". The CPU 11's process of determining whether information A indicates matter B or indicates matter C may be described conceptually as "determine from information A whether it is matter B or matter C".

In the external function process, the CPU 11 reads out, from the memory 12, a function URL of the function for which an execution instruction is accepted (S101). The CPU 11 accesses the server 3 using the acquired function URL, and receives a particular xml file which is instruction data (S102). S102 is an example of a reception process. In this embodiment, the CPU 11 reads out the function URL 221. The process of accessing the server 3 using the function URL stored in the memory 12 is also a process of requesting the server 3 to transmit instruction data.

The instruction data stored in the server 3 includes display instruction data instructing screen display and operation instruction data instructing an operation. The CPU 11 analyzes the received instruction data, and determines whether the analyzed instruction data is the display instruction data or the operation instruction data (S103). More specifically, the CPU 11 determines the instruction data to be the display instruction data if this data includes a tag <Display>, and determines the instruction data to be the operation instruction data if this data includes a tag <Command>. The name or value of each tag is not limited to an example shown in each drawing, as long as it is analyzable by the external function program 22 that analyzes instruction data.

As partly shown in FIG. 4A, for example, the instruction data 31 first received by the printer 1 by the function URL 221 of this embodiment is display instruction data that instructs display of a selection screen for selecting the data of the print target. If the received instruction data is determined to be the display instruction data (S103: display instruction), the CPU 11 causes the user interface 13 to display a display screen based on the determined instruction data (S104). If the instruction data 31 shown in FIG. 4A is received in response to the instruction to perform download printing, the CPU 11 causes the user interface 13 to display a selection screen 51, for example, including a selection button 511 for selecting "Manual" and a selection button 512 for selecting "Application form" as shown in FIG. 4B.

Then, the CPU 11 stands by until a selection operation by the user is accepted via the user interface 13 on the displayed selection screen 51 (S105). In response to determining that the selection operation by the user is accepted (S105: YES), the CPU 11 determines whether the instruction data being processed includes information for requesting transmission of next instruction data (S108). More specifically, the CPU 11 determines whether a tag <NextURL> is included. The next instruction data is instruction data to be received after the processing of the instruction data being processed. The instruction data 31 shown in FIG. 4A includes a URL for requesting next instruction data as the information in the tag <NextURL>.

In response to determining that the instruction data being processed includes information for requesting transmission of next instruction data (S108: YES), the CPU 11 acquires the next URL based on the information in the tag <NextURL> (S109). That is, in response to accepting selection of data of the print target on the selection screen 51, the CPU 11 acquires the next URL based on the information of the tag <NextURL> and the accepted selection result, returns to S102, and receives the next instruction data from the server 3.

Based on the user's input accepted on the selection screen 51 shown in FIG. 4B, for example, the CPU 11 extracts information indicating a selected button as information indicating the operation content. If "Manual" is operated, for example, the CPU 11 extracts "1" as a value corresponding to "Manual" from the instruction data. Then, by using the URL acquired from the information in the tag <NextURL>, for example, the CPU 11 transmits HTML data including the information indicating the operation content to the server 3. Based on the received HTML data, the server 3 transmits next instruction data corresponding to the selected button.

Alternatively, the CPU 11 may create a URL by adding, as a parameter, the information indicating the operation content of the user to the URL acquired from the information in the tag <NextURL>, and may transmit a request for a resource indicated by the created URL to the server 3. An operation screen for accepting user's input is not limited to a screen for accepting selection of a button but may be a screen for accepting input of text. In this case, the CPU 11 may regard inputted text itself as the information indicating the operation content.

The CPU 11 determines whether the next instruction data received from the server 3 is display instruction or operation instruction (S103). If the received instruction data is display instruction, the CPU 11 repeats the processing of S105 and S108 in a similar manner. If the received instruction data is determined to be operation instruction data (S103: operation instruction), the CPU 11 determines whether an instructed operation is download printing (S110). The instruction data 32 or the instruction data 33 shown in FIGS. 5A and 5B is instruction data including a tag <DownloadPrint>, and the CPU 11 determines that this instruction data is instruction data including an execution instruction of download printing.

The instruction data 32 shown in FIG. 5A is an example of instruction data received from the server 3 when "Manual" is selected on the selection screen 51 shown in FIG. 4B. The instruction data 33 shown in FIG. 5B is an example of instruction data received from the server 3 when "Application form" is selected on the selection screen 51. Each of the instruction data 32 and the instruction data 33 is instruction data including a tag <Command> and is operation instruction data. The operation instruction data for download printing includes an item specifying a document to be downloaded by a file name. For example, in each of the instruction data 32 and the instruction data 33 shown in FIGS. 5A and 5B, a document of a print target is specified by a file name by a tag <Path>.

Some display instruction data includes a reply instruction in addition to a display instruction. The reply instruction is an instruction to transmit a parameter, as a reply, to the server 3 based on the user's input accepted on the displayed screen. This parameter indicates at least one of a document of a print target and a print setting. For example, a designer of the print system 100 and so on may prepare display instruction data for accepting selection of a print setting such as the number of print copies, selection from duplex printing and single-side printing, or selection from color printing and monochrome printing, for example, as well as selection of a document of a download target. The display instruction data for accepting selection of a print setting includes a reply instruction to transmit the result of the accepted selection as a reply to the server 3.

If the reply instruction is included in the received display instruction data, the CPU 11 transmits information about a print setting such as the number of print copies as a reply to the server 3 based on user's input. In response to receiving the information about the print setting and an instruction to transmit next instruction data, the server 3 edits the instruction data instructed to be transmitted based on the received information, and transmits the edited instruction data to the printer 1. In response to receiving information indicating that the number of print copies is two (2) and the instruction to transmit next instruction data, for example, the server 3 generates instruction data in which the value in a tag <Collate> is "2" indicating two copies in the instruction data 32 or 33 shown in FIGS. 5A and 5B, and transmits the generated instruction data to the printer 1. The printer 1 analyzes the received instruction data, and acquires the information about the number of print copies from the value in the tag <Collate>.

That is, the printer 1 returns information of the parameter received on the input screen to the server 3, receives instruction data reflecting the information of the parameter from the server 3, so that the parameter is reflected in a series of processes. By passing the parameter indicating print settings via instruction data and reflecting the parameter in download printing, the print contents are customized when performing download printing, which enhances the convenience of the system including the printer 1.

Figure 6:
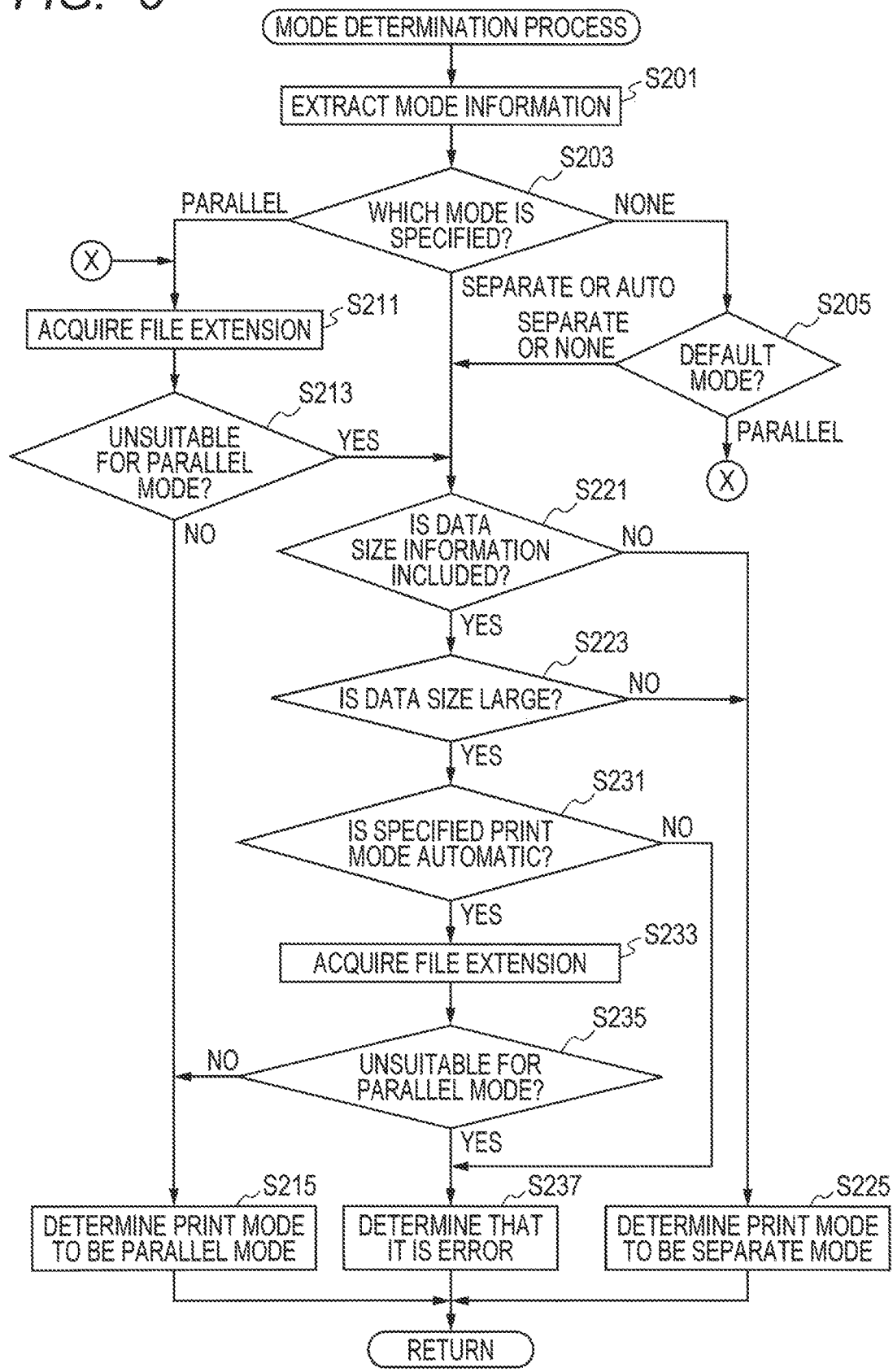
FIG. 6 is a flowchart showing the procedure of a mode determination process.

If the received instruction data is determined to be instruction data instructing download printing (S110: YES), the CPU 11 executes a mode determination process (S111). The mode determination process is a process of determining a print mode of download printing based on the characteristics of the document of the print target. The procedure of the mode determination process will be described with reference to the flowchart of FIG. 6.

In the mode determination process, the CPU 11 tries to extract mode information from instruction data (S201). The mode information is information indicating a print mode for the download printing. The mode information may be incorporated in advance in instruction data by a designer of the print system 100, for example. For example, in the instruction data 32, 33 shown in FIGS. 5A and 5B, a value in a tag <ParallelProcessing> corresponds to the mode information. The CPU 11 analyzes the instruction data to try to determine the presence or absence of the tag <ParallelProcessing> and to extract a value from this tag. The printer 1 of this embodiment accepts one of a parallel mode, a separate mode, and an automatic setting as mode information.

The separate mode is a mode of starting printing after download of an entire document is completed. The parallel mode is a mode of starting printing before download of an entire document is completed and download and printing are performed in parallel. The separate mode is an example of a first mode, and the parallel mode is an example of a second mode. The printer 1 of this embodiment is configured to perform both download printing by the separate mode and download printing by the parallel mode.

According to the separate mode, printing is not started before download is completed so it may cause delay in printing start timing. After the printing is started, however, the printing proceeds at high speed. For example, in a case of a document having a small number of pages, the time required for download is not so long, and thus the separate mode having a high printing progress speed tends to be suitable. According to the parallel mode, printing is started even if download is not completed so printing start timing comes earlier. After the printing is started, however, a waiting period for the download may be generated and this may cause delay in progress of the printing. In a case of a document having a large number of pages, it may take a long time to complete the download, and the parallel mode in which the print start timing comes early tends to be suitable.

When the instruction data includes mode information, the CPU 11 determines the mode specified by mode information (S203). Specifically, the CPU 11 determines that the mode information specifies the parallel mode if the value of the tag <ParallelProcessing> is "true", determines that the mode information specifies the separate mode if the value of the tag <ParallelProcessing> is "false", and determines that the mode information specifies the automatic setting if the value of the tag <ParallelProcessing> is "auto".

The instruction data may not include the tag <ParallelProcessing>. In response to determining that the instruction data does not include mode information (S203: none), the CPU 11 tries to acquire a default print mode (S205). The default print mode is accepted, at the time of registration of the function URL 221 mentioned above, on the registration screen shown in FIG. 2, for example, for each function URL to be registered. If the registration instruction of the function URL includes a registration instruction of the default print mode, the printer 1 stores the default print mode in association with the function URL. In S205, the CPU 11 tries to acquire the default print mode stored in association with the function URL to be executed.

In the above example, the default print mode is stored for each function URL. Alternatively, a common default print mode may be stored for a plurality of function URLs registered in the printer 1. For example, the printer 1 may accept a registration instruction of the default print mode via the EWS or the user interface 13 of the printer 1, separately from registration of the function URL 221. In that case, in S205, the CPU 11 tries to acquire the common default print mode.

In response to determining that the instruction data includes mode information that specifies the parallel mode (S203: parallel), or in response to determining that the parallel mode is registered as the default print mode (S205: parallel), the CPU 11 acquires the extension of the file specified as the target of download printing (S211). Then, the CPU 11 determines whether the file format is unsuitable for the parallel mode based on the file extension (S213).

In order to perform download printing in the parallel mode properly, the file format needs to be a format for which rasterization is started properly based on data of the downloaded part even if download of the entire document is not completed. For example, in a document of a file format in which the information indicating the print setting used for printing on the first page is included in a particular area between the beginning of the document such as the header area of the document and the end of the data on the first page, once download and analysis up to the particular area is completed, it is possible for the printer to determine the print setting required for printing on the first page. Thus, if the print setting can be determined even if the analysis of the entire document is not completed, the document is not a document with characteristics that is unsuitable for the parallel mode.

In contrast, in a document of a file format in which the information indicating the print setting used for printing on the first page may be included somewhere between the end of the data of the first page and the end of the document of a plurality of pages, the printer 1 needs to download the entire document in order to determine the print setting required to start printing. In the case of a file format in which the information of the print setting used for printing on the first page may be added to somewhere after image data of the first page and the location where the information of the print setting is added is not identified, the printer 1 cannot determine the print setting for the first page unless download to the end of the document is completed.

For example, a PDF format is a file format for which the print setting used for printing on the first page cannot be determined until the document is analyzed to the end thereof, and thus the entire document needs to be downloaded before starting printing. The document of this format is unsuitable for parallel printing. The file format is an example of characteristics of a document, and the PDF format is an example of a particular format. The document in the PDF format is an example of a document with characteristics which is unsuitable for the parallel mode.

In response to determining that the file format is not unsuitable for the parallel mode (S213: NO), the CPU 11 determines the print mode to be the parallel mode (S215). In response to determining that the file format is unsuitable for the parallel mode (S213: YES), the CPU 11 does not adopt the parallel mode. That is, in a case where the file format is unsuitable for the parallel mode, even if the mode information or the default print mode indicates the parallel mode, the printer 1 does not adopt the parallel mode as an exception.

If determination in S213 is YES, the CPU11 tries to acquire data size information. The data size information is the information indicating the data size of the document that is the target of download printing. The data size information is an example of size information. For example, the designer of the print system 100 and so on may incorporate the data size information in the instruction data in advance. For example, in the instruction data 33 shown in FIG. 5B, the value of a tag <datasize> is the data size information. The data size of a document may be acquired from a part of the document, not from the instruction data. For example, if data size information may be included in a header part of the document, the CPU 11 may try to acquire data size information by reading the header of the document.

In response to determining that the instruction data includes mode information indicating the separate mode or the automatic setting (S203: separate or auto), the CPU 11 also tries to acquire data size information. In response to determining that the instruction data does not include mode information and that the default print mode is the separate mode or not stored (S205: separate or none), the CPU 11 also tries to acquire data size information.

The CPU 11 determines whether data size information has been acquired (S221). In response to determining that the instruction data includes data size information (S221: YES), the CPU 11 determines whether the data size indicated by the data size information is larger than a threshold value based on the download area which is a storage area used for file download (S223). For example, the threshold value based on the download area may be a variable value based on the free space of the memory at that time, or may be a fixed value which is predetermined based on the storage capacity of the download area.

In response to determining that the data size information has not been acquired (S221: NO) or in response to determining that the data size indicated by the acquired data size information is not larger than the threshold value based on the download area (S223: NO), the CPU 11 determines the print mode to be the separate mode (S225).

In response to determining that the data size indicated by the acquired data size information is larger than the threshold value based on the download area (S223:YES), the CPU 11 determines that download printing in the separate mode is not to be performed. When performing download printing in the separate mode, the printer 1 temporarily stores the entire document in the memory 12. If the size of the storage area available for download is smaller than the data size of the document, the printer 1 is not able to properly perform download printing in the separate mode. Even in a case where the mode information or the default print mode indicates the separate mode, if the data size is larger than the threshold value, the download cannot be completed properly. Thus, the printer 1 does not adopt the separate mode as an exception. The data size of a document is an example of the characteristics of a document. A document of which the data size is larger than the threshold value is an example of a document with characteristics unsuitable for the first mode.

The CPU 11 determines whether the print mode specified by the instruction data is automatic setting (S231). In response to determining that the automatic setting is specified (S231:YES), the CPU 11 acquires a file extension (S233), and determines whether the file format is a file format unsuitable for the parallel mode (S235). S233 and S235 are the same processes as S211 and S213. When the print mode is not specified in the instruction data and the default print mode is not stored, the CPU 11 also make a YES determination in S231.

In response to determining that the file format is not a file format unsuitable for the parallel mode (S235: NO), the CPU 11 determines the print mode to be the parallel mode (S215). When the data size of the document is large, the parallel mode is adopted as long as the file format is a file format for which the parallel mode is allowed. Thus, even for a document of a large data size, it is more likely that download printing is performed properly.

In response to determining that the print mode specified by the instruction data is not the automatic setting (S231: NO) or in response to determining that the print mode specified by the instruction data is the automatic setting but the file format is a file format unsuitable for the parallel mode (S235: YES), the CPU 11 determines that it is an error (S237). After one of steps S215, S225, and S237, the CPU 11 ends the mode determination process and returns to the external function process.

Figure 3:
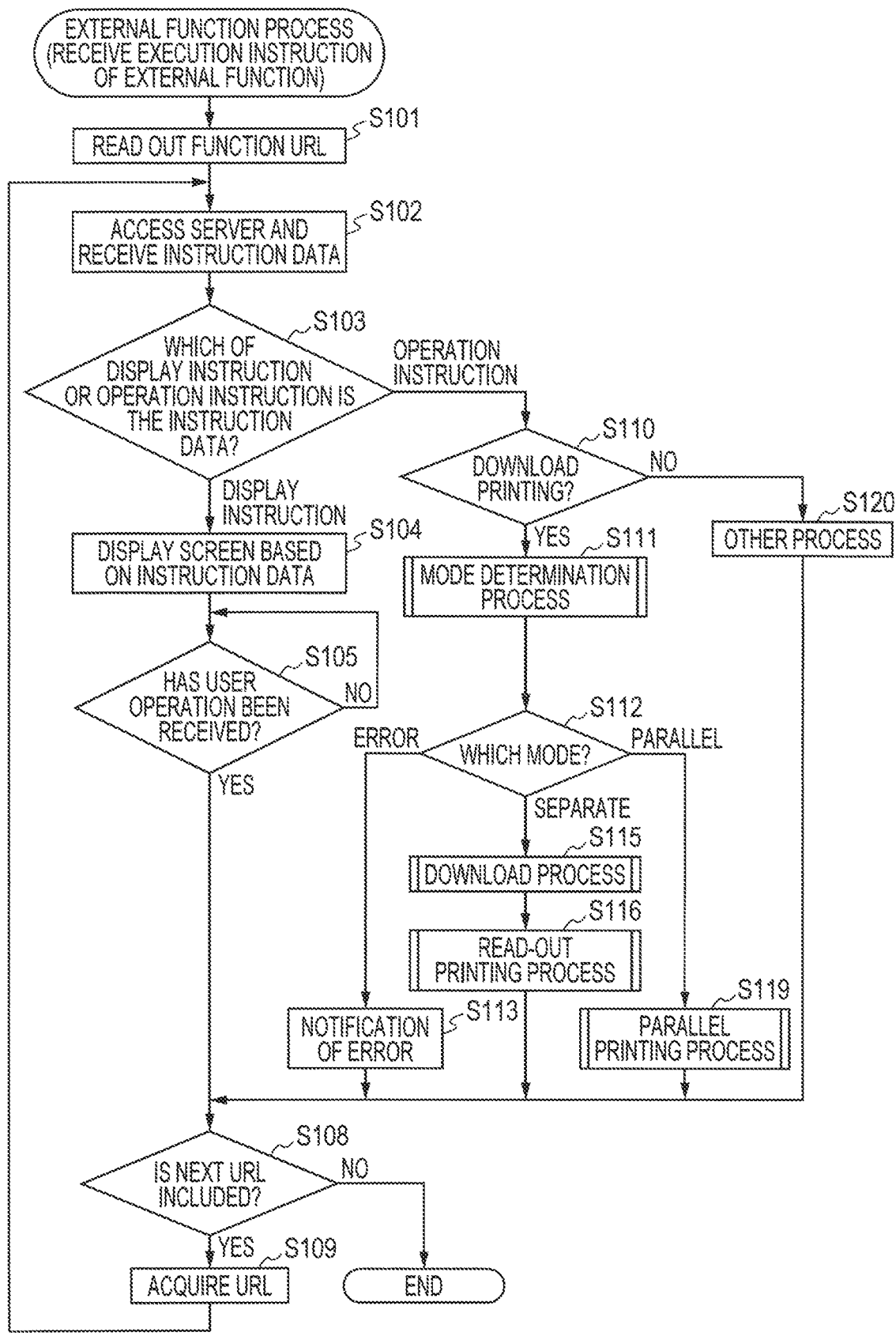
FIG. 3 is a flowchart showing the procedure of an external function process.

Returning to the external function process in FIG. 3, the CPU 11 determines which mode the determination result by the mode determination process in S111 is (S112). In response to determining in S237 of the mode determination process that it is an error (S112: error), the CPU 11 notifies about the error (S113) and proceeds to S108, without performing download and printing of the document. Alternatively, if an error is notified, the CPU 11 may end the external function process regardless of whether the next URL exists.

In response to determining that the mode determined in the mode determination process is the separate mode (S112: separate), the CPU 11 first executes a download process (S115), and subsequently executes a read-out printing process (S116). A set of the download process and the read-out printing process is an example of a download printing process of performing download printing by a first mode.

Figure 7:
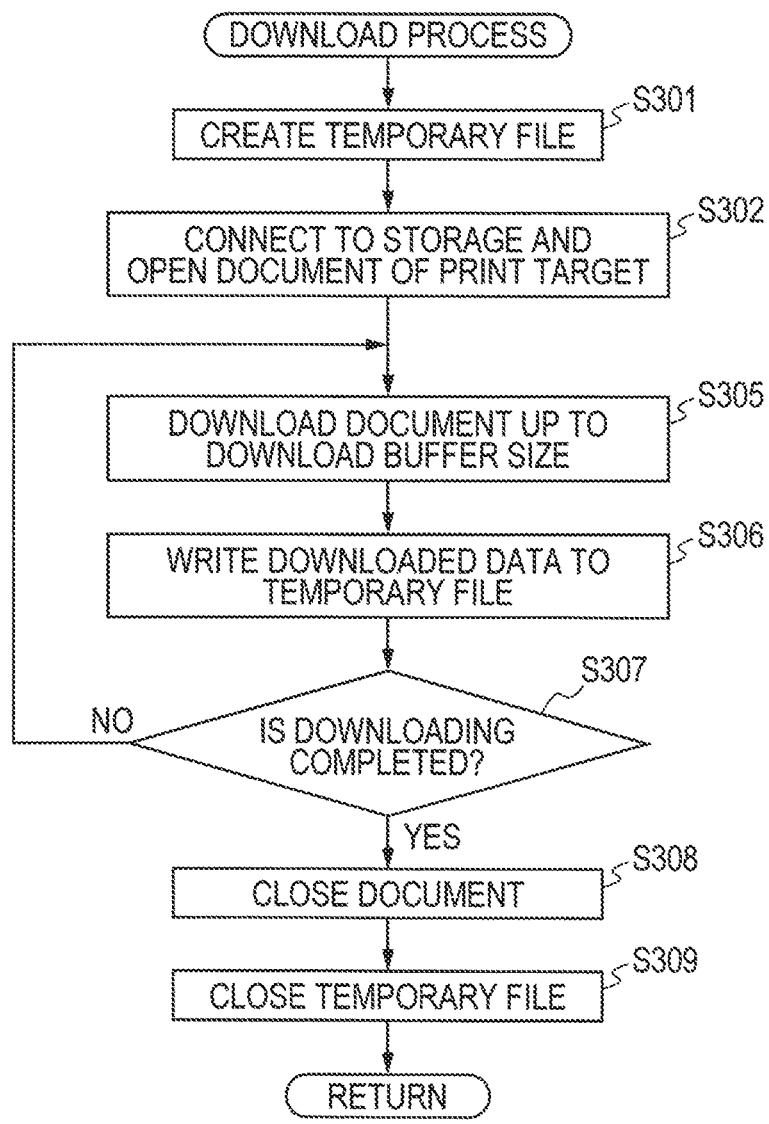
FIG. 7 is a flowchart showing the procedure of a download process.

A procedure of the download process by the separate mode will be described by referring to the flowchart in FIG. 7. The download process is processing of downloading a document from the storage 4 and storing the downloaded document into a temporary file. The temporary file is a file for temporary storage of downloaded data.

In the download process, the CPU 11 generates a temporary file in the memory 12 (S301), and connects to the storage 4 to open a document of the print target (S302). Next, the CPU 11 downloads the document of the print target in units of the size of the DL buffer 23 (see FIG. 1) (S305), and writes data having been downloaded into the temporary file generated in S301 (S306). Then, the CPU 11 determines whether download of the entire document of the print target has been completed (S307). For example, if the size of the data having been downloaded in S305 is smaller than the size of the DL buffer 23, the CPU 11 determines that the download has been completed. If the size of the data having been downloaded is equal to the size of the DL buffer 23, the CPU 11 determines that the download may not be completed.

In response to determining that the download has not been completed (S307: NO), the CPU 11 returns to S305 and performs further download and further writing into the temporary file. In response to determining that the download has been completed (S307: YES), the CPU 11 closes the document in the storage 4 (S308). Then, the CPU 11 closes the temporary file (S309), finishes the download process, and returns to the external function process.

Figure 8:
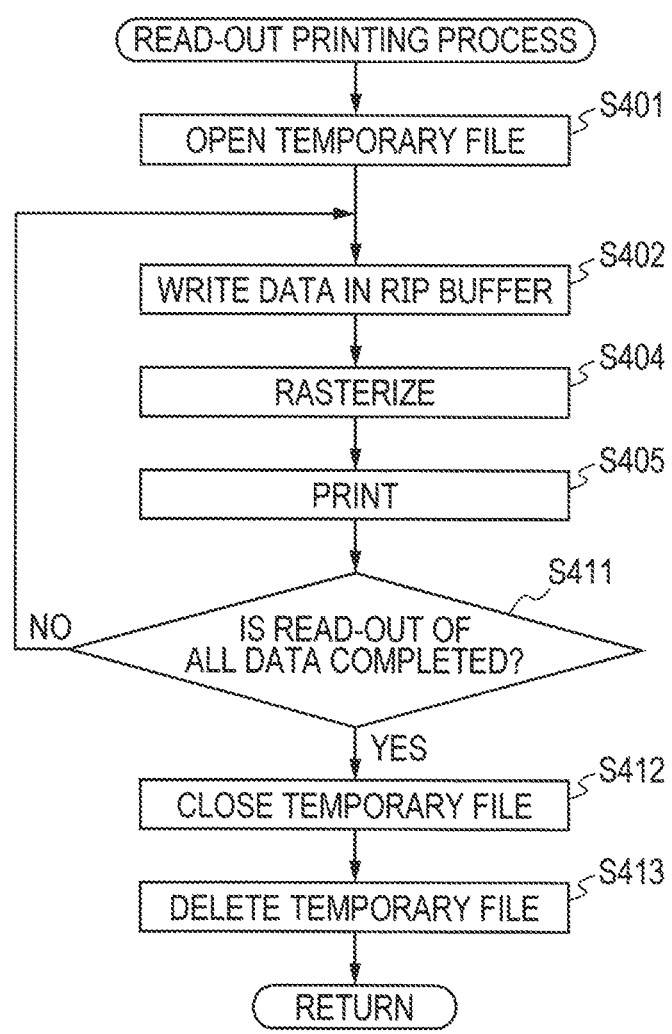
FIG. 8 is a flowchart showing the procedure of a read-out printing process.

In the external function process in FIG. 3, the CPU 11 performs the read-out printing process (S116) after completion of the download process (S115). A procedure of the read-out printing process will be described by referring to the flowchart in FIG. 8.

In the read-out printing process, the CPU 11 opens the temporary file which is generated and for which writing is performed in the above-described download process (S401). The CPU 11 reads data from the temporary file and writes the read data into the RIP buffer 24 (S402). Based on the size of free space of the RIP buffer 24, for example, the CPU 11 tries to read data of the size of free space from the temporary file and write the read data into the RIP buffer 24.

The CPU 11 processes the data written to the RIP buffer 24 according to a RIP program and a print program (not shown). Specifically, the CPU 11 sequentially rasterizes the data in the RIP buffer 24 according to the RIP program (S404), and generate print data. When generating the print data, the CPU 11 uses the parameter in the instruction data and the print setting based on the document. Further, the CPU 11 instructs the print engine 15 to perform printing based on the generated print data in accordance with the print program. This causes the print engine 15 to perform printing based on the print data (S405). The CPU 11 deletes, from the RIP buffer 24, the data of the part for which rasterization is finished.

The CPU 11 determines whether read-out of all the data in the temporary file has been completed (S411). If the size of data having actually been read out from the temporary file in S402 is smaller than the size of free space, for example, the CPU 11 determines that read-out of all the data has been completed. In response to determining that the read-out has not been completed (S411: NO), the CPU 11 returns to S402 and continues read-out from the temporary file.

In response to determining that read-out of all the data has been completed (S411: YES), the CPU 11 closes the temporary file (S412), and deletes the temporary file (S413). Then, the CPU 11 finishes the read-out printing process and returns to the external function process.

Returning to the external function process in FIG. 3, after the read-out printing process in S116, the CPU 11 proceeds to S108 and determines whether the instruction data that is being executed includes information of a further next URL. In response to determining that the mode determined by the mode determination process is the parallel mode (S112: parallel), the CPU 11 executes a parallel printing process (S119). The parallel printing process is an example of a download printing process of performing download printing in the second mode.

Figure 9:
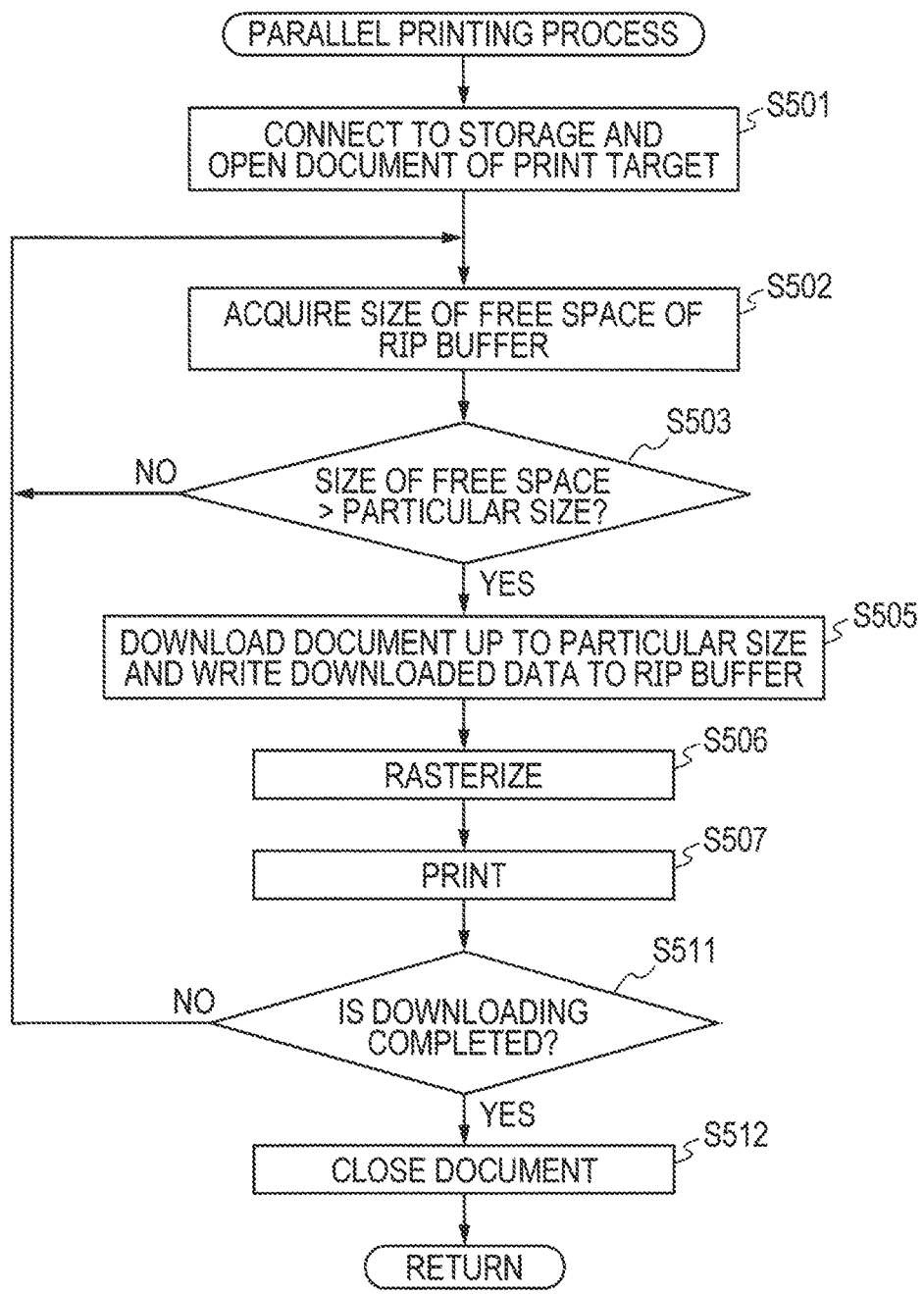
FIG. 9 is a flowchart showing the procedure of a parallel printing process.

A procedure of the parallel printing process will be described by referring to the flowchart in FIG. 9. In the parallel printing process, the CPU 11 connects to the storage 4 to open a document of the print target (S501). S501 corresponds to S302 in the download process shown in FIG. 7. Next, the CPU 11 acquires the size of free space in the RIP buffer 24 (S502). Then, the CPU 11 determines whether the size of free space is larger than a particular size (S503). The particular size is a fixed value determined in advance based on the relationship between the download speed and the printing speed of the print engine 15, on the processing speeds of the RIP program and the print program, and so on.

In response to determining that the size of free space is not larger than the particular size (S503: NO), the CPU 11 returns to S502 and acquires the size of free space in the RIP buffer 24 again. The size of free space in the RIP buffer 24 is increased gradually by deletion of data for which the rasterizing process is finished.

In response to determining that the size of free space is larger than the particular size (S503: YES), the CPU 11 downloads the document in the storage 4 up to the particular size and writes the downloaded document into the RIP buffer 24 (S505). Instead of writing the document directly into the RIP buffer 24, the CPU 11 may write the received document once into the DL buffer 23 and may transfer the written document immediately thereafter from the DL buffer 23 to the RIP buffer 24.

When the data is written into the RIP buffer 24, the CPU 11 generates print data by rasterization (S506), and instructs the print engine 15 to perform printing based on the generated print data (S507). S506 is a process similar to S404 in the read-out printing process in FIG. 8.

The CPU 11 determines whether download of the entire document of the print target has been completed (S511). For example, if the size of the data having been downloaded in S505 is smaller than the particular size, the CPU 11 determines that the download has been completed. If the size of the data having been downloaded is equal to the particular size, the CPU 11 determines that the download may not be completed. In response to determining that the download has not been completed (S511: NO), the CPU 11 returns to S502 and performs further download and further printing.

In response to determining that the download has been completed (S511: YES), the CPU 11 closes the document in the storage 4 (S512). Then, the CPU 11 finishes the parallel printing process, and returns to the external function process. If data remains in the RIP buffer 24, the CPU 11 continues to perform its processing.

Returning to the external function process in FIG. 3, after the parallel printing process of S119, the CPU 11 proceeds to S108, and determines whether the instruction data that is being executed includes information of a further next URL.

In response to determining that the received instruction data is operation instruction data and not instruction data for download printing (S110: NO), the CPU 11 executes a process based on that instruction data (S120).

An external function executable by the printer 1 is not limited to the download printing function. If the printer 1 has a document scanning function in addition to the printing function, for example, a scanning and uploading function may be provided as an external function. In this case, instruction data for performing the scanning and uploading function is prepared in the server 3, and access information about the prepared instruction data is registered as a function URL by a designer of the print system 100 and so on. Based on received instruction data, the printer 1 performs a suitable process in S120 regarding an external function other than the download printing function.

After S120, the CPU 11 proceeds to S108. In response to determining that the received instruction data includes the information of the next URL (S108: YES), the CPU 11 acquires the next instruction data from the server 3 based on the information of the next URL as described earlier. In response to determining that the received instruction data does not include the information of the next URL (S108: NO), the CPU 11 ends the external function process.

Differences in data flow between the separate mode and the parallel mode will be described while referring to FIGS. 10A and 10B. As shown in FIG. 10A, according to the separate mode, data downloaded from the storage 4 by a download processor is stored once into the DL buffer 23, and is then written into a temporary file by a file writing processor. Then, the data in the temporary file is read by a file read-out processor, written into the RIP buffer 24, rasterized by the RIP processor, and thereafter transferred to the print engine 15. The print engine 15 performs printing based on the print data generated by the rasterization. The upper section in FIG. 10A is a data flow by the download process shown in FIG. 7. The lower section in FIG. 10A is a data flow by the read-out printing process shown in FIG. 8.

As shown in FIG. 10B, according to the parallel mode, data downloaded from the storage 4 by the download processor is written into the RIP buffer 24, and rasterized by the RIP processor. The print engine 15 performs printing based on the print data generated by the rasterization. FIG. 10B is a data flow by the parallel printing process shown in FIG. 9. In many cases, the speed of reading by the file read-out processor is higher than the speed of download by the download processor. Thus, as described above, printing of a first page is likely to be started earlier according to the parallel mode, and the speed of printing after start of the printing is likely to be higher according to the separate mode.

As described in detail above, the printer 1 of this embodiment automatically determines the print mode in download printing based on the file format, the data size, and so on, which are characteristics of the document specified in the execution instruction for the download printing, that is, the document of the print target. Thus, it is expected that download printing is performed by the print mode suitable for the document.

Further, the printer 1 of this embodiment accepts selection of a print mode by the mode information included in instruction data or by default registration. However, in a case where the selected print mode is not compatible with the characteristics of the document, the printer 1 determines the print mode based on the characteristics of the document. Thus, download printing is not performed by the print mode which is incompatible with the document. This reduces a possibility that consumables are wasted, such as that an error occurs after printing is started, for example.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, the printer is not limited to a single-function printer, but may be applied to any apparatus having a printing function and a communication function via a network, such as a multifunction peripheral, a copier, and a fax machine.

In the above-described embodiment, in a case where the mode information included in the instruction data is automatic setting, the separate mode is selected when the separate mode is allowed. Alternatively, the parallel mode may be selected preferentially. In the above-described embodiment, in a case where the mode information is not included in the instruction data and the default print mode is not stored, the separate mode is selected preferentially. Alternatively, the parallel mode may be selected preferentially. In the above-described embodiment, in a case where the parallel mode is specified by the mode information or the default print mode but the file format is a file format to which the parallel mode is not applicable, it is determined whether the separate mode is applicable. Alternatively, an error may be notified in such case. Specifically, if a YES determination is made in S213 of the mode determination process, the CPU 11 may proceed to S237.

In the above-described embodiment, instruction data may be configured to include mode information. Alternatively, instruction data may not be configured to include mode information. That is, the printer 1 may not be able to acquire mode information based on the value of the tag <ParallelProcessing> in the instruction data, and may determine that the instruction data does not include mode information. In the above-described embodiment, the default print mode is registered. Alternatively, the default print mode may not be registered.

In the above-described embodiment, the print mode is determined based on two types of characteristics which are a file format and data size information, as the characteristics of a document. Alternatively, only one of the characteristics may be used.

The modes of the display screen illustrated in this specification are examples, and the arrangement of each button, the wording included, and so on are not limited to the modes shown in these figures. For example, there may be display instruction data that displays a selection screen that allows the user to select a plurality of documents. When a plurality of documents are specified on the selection screen, the printer 1 may transmit a transmission instruction including a plurality of parameters to the server 3, or may transmit a transmission instruction for each document to the server 3 sequentially.

Further, after starting download printing by the separate mode, the printer 1 may monitor the free space in the memory 12 and, if the free space in the memory 12 becomes smaller than a particular threshold, the printer 1 may start the read-out printing process without waiting for completion of the download process.

In the above-described embodiment, the size of the DL buffer 23 and the RIP buffer 24 is fixed, but the size of each buffer may be variable. Further, the printer 1 of the above-described embodiment is configured to return the parameter to the server 3, but the printer may not be configured to return the parameter.

The printer 1 of the above-described embodiment accepts an execution instruction of download printing as the execution instruction of the external function program 22, and then accepts the selection of the document to be downloaded by the user's input, but the present disclosure is not limited to this. For example, the designer and so on of the print system 100 may preliminarily store, in the memory 12, a function URL indicating the operation instruction data for download printing of a particular document. In that case, the printer 1 receives a download printing instruction preliminarily including the designation of the document as an execution instruction of the external function program 22, and thus performs download printing without displaying the screen as shown in FIG. 4B and so on.

In the above-described embodiment, as the operation instruction data, an example is shown in which one document is specified as the print target of download printing. However, one operation instruction data may specify a plurality of documents. For example, the server 3 may be provided with operation instruction data including a plurality of <Path> tags. In that case, the printer 1 may determine the print mode for each document and perform download printing.

A trigger for causing the printer 1 to perform the download printing function is not limited to a user's instruction. For example, the external function program 22 in the printer 1 may include a function URL including access information and an access condition, in addition to the function URL 221 including access information for accessing the server 3 in response to a user's instruction. For example, the access condition is a fixed time such as once a day or once a week, after an elapse of a particular period of time from a power-on time, and so on. In response to determining that an access condition is satisfied in a state where a function URL including the access condition is registered, the printer 1 starts the external function process by using access information corresponding to the access condition.

In the above-described embodiment, a document of a print target is downloaded from a storage on a network. Alternatively, a document of a print target may be received from an external device connected to the printer via the communication interface.

In any of the flowcharts disclosed in the embodiments, the plurality of processes in any of the plurality of steps may be arbitrarily changed in the execution order or executed in parallel as long as the process contents do not conflict with each other.

The processes disclosed in the embodiment may be executed by a single CPU, a plurality of CPUs, hardware such as an ASIC, or a combination thereof. Further, the processes disclosed in the embodiment may be realized in various modes such as a storage medium storing a program for executing the processes, a method, and so on.

What is claimed is:

1. A printer comprising:
a communication interface; and
a controller configured to:
acquire access information indicating a transmission source of instruction data, the instruction data instructing a process to be executed by the printer, the process to be executed by the printer including download printing of downloading a document from a storage on a network and printing the document, a print mode in the download printing including a first mode and a second mode different from the first mode,
based on the access information, access, via the communication interface, a server that is the transmission source of the instruction data, and receive the instruction data transmitted from the server; and
in response to determining that the instruction data includes an execution instruction of the download printing,
determine the print mode in the download printing based on characteristics of the document specified by the execution instruction of the download printing; and
based on the determined print mode, download, via the communication interface, the document specified by the execution instruction of the download printing, from a particular storage instructed by the instruction data, thereby receiving the document, and perform printing based on the received document, thereby performing the download printing,
the download printing including:
in response to determining the print mode in the download printing to be the first mode, performing the download printing by the first mode, the first mode being a mode of, after completing reception of an entirety of the document specified by the execution instruction of the download printing, starting printing based on the entirety of the document; and
in response to determining the print mode in the download printing to be the second mode, performing the download printing by the second mode, the second mode being a mode of, before completing reception of the entirety of the document specified by the execution instruction of the download printing, starting printing based on a received portion of the document, the second mode being a mode in which reception of the document and printing based on the document are performed in parallel.

2. The printer according to claim 1, wherein the execution instruction of the download printing is an instruction of specifying, by a file name, a document to be downloaded; and
wherein the controller is configured to:
determine the print mode in the download printing to be one of the first mode and the second mode based on the characteristics of the document specified by the execution instruction;
when performing the download printing by the first mode, after completing reception of an entirety of the document of the file name specified by the execution instruction of the download printing, start printing based on the entirety of the document; and
when performing the download printing by the second mode, before completing reception of the entirety of the document of the file name specified by the execution instruction of the download printing, start printing based on a received portion of the document, and reception of the document and printing based on the document being performed in parallel.

3. The printer according to claim 1, wherein the controller is configured to:
determine the print mode in the download printing to be one of the first mode and the second mode based on the characteristics of the document specified by the execution instruction;
in response to determining the print mode in the download printing to be the first mode, as the download printing by the first mode, after completing reception of an entirety of the document specified by the execution instruction of the download printing, start printing based on the entirety of the document and on a parameter included in the instruction data; and
in response to determining the print mode in the download printing to be the second mode, as the download printing by the second mode, before completing reception of the entirety of the document specified by the execution instruction of the download printing, start printing based on a received portion of the document and on the parameter included in the instruction data, reception of the document and printing based on the document being performed in parallel.

4. The printer according to claim 1, wherein the controller is configured to:
in response to determining the print mode in the download printing to be the first mode, after completing reception of an entirety of the document specified by the execution instruction of the download printing, analyze the entirety of the document to identify a print setting, and start printing based on the entirety of the document; and
in response to determining the print mode in the download printing to be the second mode, before completing reception of the entirety of the document specified by the execution instruction of the download printing, analyze a received portion of the document and start printing upon identifying a print setting necessary for start of printing, and reception of the document and printing based on the document being performed in parallel.

5. The printer according to claim 1, wherein the controller is configured to:
acquire size information indicating a data size of the document as the characteristics of the document; and
in response to determining that the data size indicated by the acquired size information is larger than a threshold value, determine the print mode in the download printing to be the second mode, the threshold value being determined based on a download area which is a storage area for storing the received document.

6. The printer according to claim 5, wherein one of the first mode and the second mode is registered as a default print mode; and
wherein the controller is configured to:
in response to determining that the first mode is registered as the default print mode and that the characteristics of the document specified by the execution instruction is not characteristics unsuitable for the first mode, determine the print mode in the download printing to be the first mode, the data size larger than the threshold value being characteristics unsuitable for the first mode; and
in response to determining that the second mode is registered as the default print mode and that the characteristics of the document specified by the execution instruction is not characteristics unsuitable for the second mode, determine the print mode in the download printing to be the second mode.

7. The printer according to claim 5, wherein the instruction data includes mode information indicating the print mode in the download printing, the mode information including one of the first mode, the second mode, and an automatic setting; and wherein the controller is configured to:
in response to determining that the instruction data includes the mode information indicating the first mode and that the characteristics of the document specified by the execution instruction is not characteristics unsuitable for the first mode, determine the print mode in the download printing to be the first mode, the data size larger than the threshold value being characteristics unsuitable for the first mode; and in response to determining that the instruction data includes the mode information indicating the second mode and that the characteristics of the document specified by the execution instruction is not characteristics unsuitable for the second mode, determine the print mode in the download printing to be the second mode.

8. The printer according to claim 1, wherein the controller is configured to:
acquire a file format of the document as the characteristics of the document; and
in response to determining that the acquired file format is a particular format, determine the print mode in the download printing to be the first mode, the particular format being a file format that an entirety of the document needs to be received for determining a print setting necessary for start of printing of the document.

9. The printer according to claim 8, wherein one of the first mode and the second mode is registered as a default print mode; and wherein the controller is configured to:
in response to determining that the first mode is registered as the default print mode and that the characteristics of the document specified by the execution instruction is not characteristics unsuitable for the first mode, determine the print mode in the download printing to be the first mode; and in response to determining that the second mode is registered as the default print mode and that the characteristics of the document specified by the execution instruction is not characteristics unsuitable for the second mode, determine the print mode in the download printing to be the second mode, the particular format being characteristics unsuitable for the second mode.

10. The printer according to claim 1, wherein one of the first mode and the second mode is registered as a default print mode; and wherein the controller is configured to:
acquire size information indicating a data size of the document and a file format of the document as the characteristics of the document;
in response to determining that the first mode is registered as the default print mode and that the characteristics of the document specified by the execution instruction is not characteristics unsuitable for the first mode, determine the print mode in the download printing to be the first mode, the data size larger than a threshold value being characteristics unsuitable for the first mode, the threshold value being determined based on a download area which is a storage area for storing the received document; and in response to determining that the second mode is registered as the default print mode and that the characteristics of the document specified by the execution instruction is not characteristics unsuitable for the second mode, determine the print mode in the download printing to be the second mode, the characteristics unsuitable for the second mode including a particular format, the particular format being a file format that an entirety of the document needs to be received for determining a print setting necessary for start of printing of the document.

11. The printer according to claim 1, wherein the instruction data includes mode information indicating the print mode in the download printing, the mode information including one of the first mode, the second mode, and an automatic setting; and wherein the controller is configured to:
in response to determining that the instruction data includes the mode information indicating the first mode and that the characteristics of the document specified by the execution instruction is not characteristics unsuitable for the first mode, determine the print mode in the download printing to be the first mode; and in response to determining that the instruction data includes the mode information indicating the second mode and that the characteristics of the document specified by the execution instruction is not characteristics unsuitable for the second mode, determine the print mode in the download printing to be the second mode.

12. The printer according to claim 11, wherein the controller is configured to:
in response to determining that the characteristics of the document specified by the execution instruction is the characteristics unsuitable for the first mode and that the characteristics of the document specified by the execution instruction is the characteristics unsuitable for the second mode, not perform download and printing of the document.

13. A print system comprising a printer and a server, the printer configured to:
acquire access information indicating a transmission source of instruction data, the instruction data instructing a process to be executed by the printer, the process to be executed by the printer including download printing of downloading a document from a storage on a network and printing the document, a print mode in the download printing including a first mode and a second mode different from the first mode; and based on the access information, transmit, to the server, a request for transmitting the instruction data;
the server configured to:
in response to receiving the request for transmitting the instruction data, transmit the instruction data to the printer;
the printer configured to:
receive the instruction data transmitted from the server; and
in response to determining that the instruction data includes an execution instruction of the download printing, determine the print mode in the download printing based on characteristics of the document specified by the execution instruction of the download printing; and based on the determined print mode, download the document specified by the execution instruction of the download printing, from a particular storage instructed by the instruction data, thereby receiving the document, and perform printing based on the received document, thereby performing the download printing, the download printing including:

in response to determining the print mode in the download printing to be the first mode, performing the download printing by the first mode, the first mode being a mode of, after completing reception of an entirety of the document specified by the execution instruction of the download printing, starting printing based on the entirety of the document; and in response to determining the print mode in the download printing to be the second mode, performing the download printing by the second mode, the second mode being a mode of, before completing reception of the entirety of the document specified by the execution instruction of the download printing, starting printing based on a received portion of the document, the second mode being a mode in which reception of the document and printing based on the document are performed in parallel.

14. A non-transitory computer-readable storage medium storing a set of program instructions for a printer, the set of program instructions, when executed by a controller of the printer, causing the printer to:

acquire access information indicating a transmission source of instruction data, the instruction data instructing a process to be executed by the printer, the process to be executed by the printer including download printing of downloading a document from a storage on a network and printing the document, a print mode in the download printing including a first mode and a second mode different from the first mode, based on the access information, access, via a communication interface of the printer, a server that is the transmission source of the instruction data, and receive the instruction data transmitted from the server; and in response to determining that the instruction data includes an execution instruction of the download printing, determine the print mode in the download printing based on characteristics of the document specified by the execution instruction of the download printing; and based on the determined print mode, download, via the communication interface, the document specified by the execution instruction of the download printing, from a particular storage instructed by the instruction data, thereby receiving the document, and perform printing based on the received document, thereby performing the download printing, the download printing including:

in response to determining the print mode in the download printing to be the first mode, performing the download printing by the first mode, the first mode being a mode of, after completing reception of an entirety of the document specified by the execution instruction of the download printing, starting printing based on the entirety of the document; and in response to determining the print mode in the download printing to be the second mode, performing the download printing by the second mode, the second mode being a mode of, before completing reception of the entirety of the document specified by the execution instruction of the download printing, starting printing based on a received portion of the document, the second mode being a mode in which reception of the document and printing based on the document are performed in parallel.

15. A printer comprising:
a communication interface; and
a controller configured to:

receive, via the communication interface, instruction data transmitted from an external device, the instruction data being data instructing printing of a document received via the communication interface;

determine a print mode in the printing, based on characteristics of the document received via the communication interface; and based on the determined print mode, receive the document via the communication interface and perform printing based on the received document, thereby performing reception printing, the reception printing including:

in response to determining the print mode to be a first mode, performing the reception printing by the first mode, the first mode being a mode of, after completing reception of an entirety of the document received via the communication interface, starting printing based on the entirety of the document; and in response to determining the print mode to be a second mode, performing the reception printing by the second mode, the second mode being a mode of, before completing reception of the entirety of the document received via the communication interface, starting printing based on a received portion of the document, the second mode being a mode in which reception of the document and printing based on the document are performed in parallel.

* * * * *